United States Patent [19]
Luttinger et al.

[11] Patent Number: 5,338,346
[45] Date of Patent: Aug. 16, 1994

[54] SOFT COATING COMPOSITIONS FOR METALS

[75] Inventors: Lionel B. Luttinger, Andover; Rosanna P. Rudy, East Hanover, both of N.J.; Paul J. Holtzapfel, Iron, Ohio

[73] Assignee: Ashland Oil, Inc., Columbus, Ohio

[21] Appl. No.: 81,438

[22] Filed: Jun. 21, 1993

Related U.S. Application Data

[63] Continuation-in-part of Ser. No. 902,168, Jun. 22, 1992, abandoned.

[51] Int. Cl.$^5$ .............................................. C09D 5/08
[52] U.S. Cl. ................... 106/14.29; 106/14.26; 106/14.34; 106/14.38; 106/14.41; 106/14.43; 427/372.2; 427/384; 427/385.5; 427/388.1
[58] Field of Search ............... 106/14.26, 14.29, 14.33, 106/14.34, 14.38, 14.39, 14.41, 14.43, 14.44; 427/372.2, 384, 385.5, 388.1

[56] References Cited

U.S. PATENT DOCUMENTS

| | | | |
|---|---|---|---|
| 3,925,087 | 12/1975 | Lechner et al. | 106/14.25 |
| 4,495,225 | 1/1985 | Ciuba et al. | 106/14.38 |
| 4,631,083 | 12/1986 | Christhilk et al. | 106/14.38 |
| 4,675,215 | 6/1987 | Ciuba et al. | 427/372.2 |
| 4,718,942 | 1/1988 | Laura et al. | 106/14.38 |
| 4,729,791 | 3/1988 | Laura et al. | 106/14.38 |
| 4,749,412 | 6/1988 | Ciuba et al. | 106/14.38 |

Primary Examiner—Anthony Green
Attorney, Agent, or Firm—David L. Hedden

[57] ABSTRACT

This invention relates to a soft coating for ferrous metal surfaces tanks, having a thickness of about 1–10 mils, comprising over-based alkaline aliphatic-aromatic organic sulfonate salt, an alkaline earth metal or zinc salt of a naphthalene sulfonate, a drying oil, a metal drier, and a paraffinic oil. The coating is particularly useful for coating ferrous metal surfaces, such as ballast tanks, which are exposed to seawater. The invention also relates to a process for inhibiting the corrosion of ballast tanks.

16 Claims, No Drawings

SOFT COATING COMPOSITIONS FOR METALS

CROSS REFERENCE TO RELATED APPLICATION

This application is a continuation-in-part of U.S. application Ser. No. 07/902,168 filed on Jun. 22, 1992 and now abandoned, and to which priority is claimed.

TECHNICAL FIELD OF THE INVENTION

This invention relates to solventless, soft coating compositions for metals exposed to aqueous environments comprising: (a) an overbased alkaline earth organic aliphatic or mixed one ring aliphatic-aromatic sulfonate salt, (b) an alkaline earth metal or zinc salt of an alkyl substituted naphthalene sulfonate, (c) a drying oil, (d) a metal drier, and (e) a heavy paraffinic oil. The coating composition is particularly useful for coating ferrous metal surfaces, such as ballast tanks, which are exposed to seawater. The invention also relates to a process for inhibiting the corrosion of metals exposed to aqueous environments.

BACKGROUND OF THE INVENTION

Corrosion of metals can be a significant problem where metal surfaces are exposed to water, air, inorganic metal salts, and the like. One of the most severe sources of corrosion is a seawater environment, that is, seawater itself, seawater mist or spray, or the salty air which can exist near bodies of seawater. A seawater environment can attack and corrode ferrous and non-ferrous metals.

A variety of equipment is subject to corrosion by seawater, including piping, dry-docks, steel cables, superstructures of an equipment on offshore drilling and production rigs, desalination plants, seawater mineral extracting plants, surfaces of ships and barges, and tanks subjected to seawater environment.

Such equipment is quite large in surface area, but is not subject to severe frictional and abrasive force. It requires an inexpensive, yet effective, coating to protect its ferrous metal from the seawater environment. Soft skin coatings which do not contain expensive pigments are useful for this purpose. Although such coatings are not hard, they do provide a "skin" which protects the metal surface from the seawater environment.

Many soft skin coatings are known, such as those disclosed in U.S. Pat. Nos. 3,925,087, 4,495,225, 4,675,215, and 4,729,791, which provide corrosion protection from aqueous environments for metal surfaces. All of these patents describe soft skin coatings which contain specified combinations of (a) an overbased alkaline earth organic aliphatic or mixed one ring aliphatic-aromatic sulfonate salt, (b) a drying oil, (c) a metal drier, (d) a paraffinic oil, and possibly (e) a solvent. These coatings disclosed provide corrosion resistance for metals which are exposed to aqueous environments, particularly saltwater environments. The thickness of the coatings is usually no greater than 10 mils, but is typically, 1 to 3 mils.

A well known and commercially successful ballast coating within the scope of U.S. Pat. No. 3,925,087 is MAGNAKOTE® ballast tank coating. This commercial coating is highly effective in inhibiting the corrosion of ballast tanks and other large surface area equipment made of ferrous metals which is exposed to a seawater environment.

In general, a thicker coating will last longer and provide better corrosion resistance than a thinner coating of an equally effective substance, but is more expensive and takes longer to apply. Additionally, when a thicker layer is applied, the coating requires an inconveniently long period of time to cure. In addition, a thicker layer tends to flow, and a coating thickness of greater than about 3 or 4 mils generally cannot be maintained. Further, while these coatings are considered the best available from an economic level for inhibiting the corrosion of ferrous metal surfaces, they are typically useful for only a period of up to two years before a new coat is required. Consequently, longer-lasting corrosion protection is highly desirable.

Accordingly, a need exists for a corrosion inhibiting soft skin coating which will maintain a coating thickness of preferably 3 mils or less, which will cure rapidly, resist sagging, and exhibit exceptionally effective and long-lasting corrosion inhibition.

SUMMARY OF THE INVENTION

This invention relates to a solventless, soft coating composition primarily for ferrous metal surfaces exposed to seawater, having a thickness of up to 1–10 mils, comprising as a mixture:
(a) an overbased alkaline earth organic aliphatic or mixed one ring aliphatic-aromatic sulfonate salt;
(b) a salt of an alkyl substituted naphthalene sulfonate in amount effective to improve the corrosion resistance of the non ferrous metal coated with the soft skin coating;
(c) a drying oil;
(d) a metal drier; and
(e) a heavy paraffinic oil.

The coating composition is particularly useful for coating ferrous metal surfaces which have a large surface area, such as ballast tanks, which are exposed to seawater. When compared to MAGNAKOTE® ballast tank coating mentioned previously, it exhibits improved corrosion resistance. This is believed to result from the addition of the salt of an alkyl substituted naphthalene sulfonate. The coatings also are more resistant to abrasion by water, show greater sag resistance, and afford less damage to the environment because they are less volatile than MAGNAKOTE ballast tank coatings.

The coating, which cures quickly to a soft, but durable coating, exhibits little sagging or running during application, and adheres exceptionally well to metal surfaces. The coating will generally withstand warm water or turbulence. It is useful for marine and offshore drilling applications, including desalination plants, seawater mineral extract plants, the bottom section of a jack-up rig, seawater cooling circuits, portuary installations, metal equipment, pipes, and the like.

The coating composition of this invention cures quickly to form a soft protective layer which is sag resistant and abrasion resistant. The coating can penetrate a porous surface, i.e. rust, or spread under existing corrosion-inhibiting coatings, and has little or no tendency to crack, flake or peel.

DETAILED DESCRIPTION OF THE INVENTION

Overbased Organic Sulfonate Salts

The composition of the present invention includes about 5 to 80 percent by weight, preferably 20 to 40 percent by weight, and more preferably 25 to 35 percent by weight, of a rust-inhibitive, grease-like concentrate. The concentrate comprises a thixotropic inorganic/organic complex stably dispersed in an essentially inert liquid or oily phase, in an amount not to exceed 4 parts per part of the complex, of the essentially inert liquid oil phase.

The inorganic/organic complex comprises an overbased alkaline earth organic sulfonate salt. The preferred complexes are overbased salts of organic sulphonic acids which can be characterized by the following structural formula:

$$(RSO_3)_m MaM_x X_m$$

wherein
R represents an alkyl-aryl group, e.g. $C_{18-40}H_{32-73}PH$ (wherein PH represents phenylene);
M represents a metal of valence m;
m represents the valence of M and is preferably an integer ranging from 1 to 4, more typically 1 or 2;
X represents a basic anion having a valence of x;
X represents the valence of X and typically an integer raging from 1 to 3; and
a represents the excess over stoichiometry, in equivalents, for the basic salt $M_x X_m$.

Accordingly, a is greater than O and preferably greater that n. As is shown by U.S. Pat. No. 3,453,124 (Wurstner) values for a of 3 or 4 are not unusual and values of about 8 or more are permissible.

The inorganic/organic complexes are available in grease-like concentrates wherein the inorganic/organic complex has been stably dispersed in an inert oily diluent. The amount of inorganic/organic complex in these concentrates is said to amount to at least 25% by weight and more typically 40-70% by weight. Accordingly, the amount of oily diluent is typically about 50 parts per 100 by weight, based on the weight of the complex. A diluted concentrate containing, for example, 70% hydrocarbon oil can be used without substantial modification in this invention.

The preferred rust-preventing concentrate consists essentially of a grease-like dispersion of the inorganic/organic complex in oil and has the following physical and chemical properties:
Specific gravity at 60° F.: 1.006 g./c.c.
Brookfield viscosity (No. 6 spindle at 10 rpm, 77° F.): 110,000–150,000 centipoise.
Flash point, COC 375° F.,
"Non-Volatiles" (Federal Standard 141A Method 4041.1): 96 wt, %, minimum
Sulfated ash, ASTM Test D-874: 24.5%

This product, commercially designated as SACI ® 200 A or SACI 200 AS overbased organic sulfonate salt (this latter product has somewhat higher viscosity and solids than the SACI 200 A overbased organic sulfonate salt) is polar and thixotropic. It is available from Witco Chemical Corporation, New York. It is compatible with aromatic, aliphatic, or chlorinated hydrocarbons commonly used as diluents. The amount of inorganic/organic complex dispersed in the oil is around 40% by weight, and the complex is the calcium sulfonate/calcium carbonate type having the formula $(RSO_3)_2 Ca$, wherein R and a have the significance indicated previously. Although the SACl 200 A overbased sulfonate salt is recommended for use in interior protective coatings, it is preferred for outdoor use in the context of this invention.

In the preferred embodiments of this invention, the amount of concentrate is at least about 5% by weight and not more than about 80% by weight. Preferably, for improved corrosion resistance, adhesion, coating thickness, and curing, the concentrate is present in the composition at a concentration of about 20–40% by weight.

The SACl 200 A overbased sulfonate salt appears to be among the most effective concentrates which can be used in the context of this invention. While not wishing to be limited to any theory, we theorize that the particular crystal structure of the calcium carbonate contained therein contributes to the beneficial results obtained where SACl 200 A overbased organic sulfonate salt is used in the method and composition of this invention.

Salts of Alkyl Substituted Naphthalene Sulfonates

The preferred salts of alkyl substituted naphthalene sulfonates can be represented by the following structural formula:

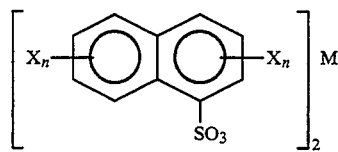

wherein "n" is 0 or 1, but at least one "n" is 1, and "X" is an alkyl group having 6 to 40 carbon atoms, preferably 6 to 30 carbon atoms, more preferably 8 to 19 carbon atoms, and may be linear or branched, and M is an alkaline earth metal cation or zinc. The preferred salts of alkyl substituted naphthalene sulfonates is one where both rings contain an "x" group, and most preferably where each x group is $C_9 H_{16}$ and M = calcium, zinc, magnesium, or barium. This product is commercially available as NA-SUL CA/W1745 from King Industries.

The salts of the alkyl substituted naphthalene sulfonates are used in amount effective to improve the corrosion resistance of the metal coated with the soft skin coating composition. This is generally in an amount of 1–25 weight percent, preferably 3–18 weight percent, and most preferably 5–15 weight percent, based upon the total weight of coating composition.

Drying Oils

The coating further contains about 1 to 25 percent by weight of a drying oil, preferably from 5 to 15 percent by weight, more preferably from 7 to 15 percent by weight, said percent by weight is based upon the total weight of the coating composition. A main characteristic of drying oils is a high content of unsaturated fatty acids. The drying oil is characterized in that it is miscible in a diluent oil selected from the group consisting of aliphatic hydrocarbon diluents, cycloaliphatic hydrocarbon diluents, aromatic hydrocarbon diluents and mixtures thereof, boiling at temperatures above 150° C.

The preferred drying oil in the context of this invention is tung oil, also known as eleostearic acid. Tung oil is preferred for reasons of effectiveness in providing corrosion-resistance of the total composition. Another highly suitable drying oil for the purposes of this invention is oiticica oil. Adequate results have also been obtained with other drying oils such as linseed oil. Other suitable drying oils will no doubt occur to those skilled in the art.

Generally, the amount of drying oil should not exceed the amount of inorganic/organic complex, to avoid brittleness in the cured coating. The ratio of inorganic/organic complex to drying oil can range up to about 10:1 and higher. For reasons of improved drying and prolonged corrosion resistance, a preferred ratio generally falls within the range of about 1:1 to 3:1.

Hydrocarbon Oil Diluents

The preferred diluents used in this invention are the paraffinic oils and the naphthenic oils, which generally boil over a range of temperatures and do not have sharp boiling points. The boiling range for, for example, kerosene is typically about 175°–325° C. Higher boiling paraffinic and naphthenic oils have boiling ranges starting at about 250° C., e.g., 260° C. or more. Commercially available concentrates of the inorganic-organic complex typically already contain 40% by weight or more of one of these petroleum- or coal tar-derived oils.

Metal Driers

The coating also contains a metal drier in an amount effective to dry the drying oil. Generally, this is an amount of about 0.001 to 0.5 percent by weight of a metal in the metal drier, preferably about 0.002 to 0.02, said percent by weight is based upon the weight of the coating. The metal of the metal drier is selected from the consisting of carboxylates and/or naphthenates of transition metals and rare earth metals. Preferably the metal of the metal driers is selected from the group consisting of cobalt, zinc, lead, manganese, lanthanum, cerium, iron, and copper, most preferably cobalt and manganese. More preferably, a mixture of carboxylate metal driers is used wherein the metals of the metal drier are cobalt and manganese and the ratio of cobalt to manganese is from 1:10 to 10:1, most preferably 10:1 to 1:10, and the weight percent of metal drier in the coating is from 0.002 to 0.02%.

The coating may also contain additional components such as viscosity modifiers, pigments, oxidized petrolatum, polyisobutylene, etc.

Preparation of the Composition

To prepare a coating, the paraffinic oil is heated in any suitable container such as a beaker, a drum, or the like. Heating elements may be used, or the container may be placed in a hot room. Other methods of heating can be used if desired. Other components, such as the organic overbased sulfonate, can also be pre-heated before addition to the mixing vessel to facilitate the mixing of components.

The overbased organic sulfonate salt and naphthalene sulfonate salt are added to the heated paraffinic oil. The components should be thoroughly mixed, usually for about 30 minutes, for example with a motor-driven propeller mixer. The remaining components are slowly added, with thorough mixing between the addition of each component. A suggested but not critical order of addition of the remaining ingredients would be the drying oil and the individual metal driers.

After all of the components have been added, it is recommended that composition be mixed for an additional period of time to insure thorough mixing. Preferably, the composition is mixed for an additional 30 minutes.

During the addition of components and mixing, care should be taken to avoid the entrapment of air into the mixture. At the suggested temperature, the viscosity of the mixture is such that entrapped air bubbles are unlikely to rise to the surface and escape.

The composition can be stored in appropriate sealed containers, under ambient conditions.

Method of Preventing Corrosion

Corrosion is inhibited on ferrous metal surfaces by applying the coating to the surface to be protected at a thickness of about 1–10 mils, and allowing the coating to cure. Frequently, the coating thickness will be about 3–4 mils. The coating can be formed by any suitable application method such as brushing, rolling, immersion of the surface to be coated, spraying, or the like. Generally, where necessary, the coating will flow sufficiently to provide a smooth and uniform coating even when applied by brush, roller, or the like.

For immersion coating, the surface to be coated is simply dipped into the composition and then removed. The thickness of the coating applied in this way will, of course, vary depending upon the viscosity of the coating composition.

For reasons of cost effectiveness, spraying is the preferred method of application. Generally, spray coating can be accomplished using less of the coating composition. Suitable spraying techniques are well known in the art.

Several external factors affect the curing of the coating composition of this invention. These factors include the presence of oxygen or air (greater air circulation generally contributes to faster curing); the presence of moisture in the air (less moisture generally contributes to faster curing); the temperature (higher temperatures generally contribute to faster curing); and the coating thickness (a thinner coating generally tends to cure faster). Sometimes these factors affect one another. We have found that a 3 mil coating will typically cure, under most conditions, within about 24 hours. Thicker coatings will require more curing time up to, for example, 48 hours, or under more rigorous conditions, up to 72 hours.

It is preferred that any loose rust or other substances which would limit adhesion be physically or chemically removed from a surface prior to coating. Power or manual wire brushing is preferred. It is not necessary to remove the tightly bonded rust which will very often be found on a metal surface. However, use of a degreaser such as solvent emulsifying compound is recommended where there is any oily contamination.

The following Examples provide specific embodiments of the invention. Other embodiments of the invention are contemplated which are within scope of the invention. All "parts" in the examples are parts by weight based upon the total weight of the coating composition unless otherwise specified.

COMPARATIVE EXAMPLES AND EXAMPLES 1-5

A coating (Comparative Example A) was prepared by first heating a 100 weight naphthenic oil sold under the trade name Telura 323 in a vessel at a temperature of 50° C. in the amounts stated in Table I. Then 20 parts of SACI 200 AS, an organic sulfonate sold by WITCO Chemical was added. Thereafter, 7.0 parts of tung oil (obtained from Welch, Holme & Clark Co., Inc.) were added to the mixture.

Comparative Example A is a well known and commercially successful ballast coating sold under the trademark "MAGNAKOTE" and claimed in U.S. Pat. No. 3,925,087. It has been shown to be highly effective in inhibiting the corrosion of ballast tanks and other large surface area equipment which is exposed to a seawater environment.

In Comparative Example B, the procedure of Comparative Example A was followed except the weight of the paraffinic oil used was 300 weight instead of 100 weight.

In Comparison Example C, the procedure of Comparison Example B was followed except SACI 200 AS was used in an amount of 30 parts by weight instead of 20 parts by weight.

In Comparison Example D, the procedure of Comparative Example B was followed except a naphthalene sulfonate salt (NA-SUL 729, sold by King Corporation) was added to the heated paraffinic oil after the SACI 200 AS in an amount of 5 parts by weight based upon the total weight of the coating composition. A propeller mixer was inserted into the vessel and the components were mixed for about 30 minutes.

Example 1 is the same as Comparison D except a mixture of metal driers comprising 0.06 part by weight of a cobalt metal drier solution containing 5% by weight of cobalt, and 0.06 part by weight of a manganese metal drier solution containing 5% manganese by weight. Mixing continued for an additional 30 minutes after all components had been added.

Comparison Example E is the same as Comparison Example D except that 10 parts by weight of NA-SUL 729 was used instead of 5 parts by weight. Example 2 is the same as Example 1 except that 10 parts by weight of NA-SUL 729 was used instead of 5 parts by weight.

Examples 3 through 5 all contain 0.06 each of 5% cobalt and manganese hydrocure driers. The following tests were conducted on the formulations:

Salt Fog Test

The salt fog or salt spray test was conducted as substantially set forth in ASTM B117.73. The salt fog or salt spray test is considered to be considerably more severe than other tests such as the static immersion test or the agitated immersion test.

To conduct the salt fog test, a metal panel (mild steel ASTM A366) measuring 2" × 4" × 1/16" was coated with a 3 mil thickness of the coating by dipping the panel into a vessel containing the composition. The coating on the panel was allowed to cure under ambient conditions (25° C., 30% humidity). Except for Comparative Examples D and E, the coatings cured satisfactorily to a soft film within 24-48 hours.

The panel was placed in a salt-fog chamber, in a rack, leaning slightly back from a vertical position. The panel was supported at two points at its bottom edge and one point at its middle backside. The salt-fog chamber was operated at about 35° C., at 100% humidity, with a 5% NaCl mist or fog. The coated panel was observed at irregular time intervals for signs of corrosion, by visual inspection of the panel left undisturbed in the rack. Table I shows the data recorded in hours when about 10% of the panel surface exhibited light corrosion and, in come cases, at other corrosion levels.

Volatile Organic Level

Volatile organic level was determined by ASTM Method D-2369-80.

Rust Penetration

Panels were half coated with product (3 mils) and cured for 48 hours. The panels were placed in the salt fog unit for 48 hours to rust the exposed metal surface. After 1 day dry, the rusted side was coated with product to an approximate thickness of 3 mils taking into account the irregular rusted surface. After another 48 hour cure, the panels were again placed in the salt fog unit for two weeks (336 hours). After this time, the panels were removed and observed for penetration on the rusted surface.

Sag Index

This test was designed to give an indication of the ability of the coating to adhere to a surface, in this case, clean steel panels with minimum sag. A 12" × 6" panel was coated with the test film to a 3 mil thickness using a film applicator and placed vertically to simulate walls of coated product. The film thickness was measured 1" from the top and 1" from the bottom using a wet film thickness gauge. Measurements were taken after 30 minutes. The Sag Index is the ratio of film thickness at the top and bottom marks:

$$\text{Sag Index} = \frac{\text{Thickness 1'' from Top}}{\text{Thickness 1'' from Bottom}}.$$

The higher the Sag Index the less the tendency of the film to sag or run off. A ratio of 1.0 indicates zero sagging (no runoff).

Abrasion Resistance

A mechanical test rig was set up to pump water through a nozzle at a rate to simulate rushing water over a coating surface encountered in ballasting and deballasting. Panels coated to a 3 mil thickness and cured for a minimum of 48 hours were placed 1" under a 3/16" ID nozzle in which the water flowed at a rate of 2 gallons/minute, calculated at 15 ft/sec. The test was conducted for a period of 30 minutes or to failure, after which the applied coating was observed for peeling, erosion, and other signs of wear.

Throughout the testing, the coating adhered well to the metal, for the preferred formulations. The blanks in Table I indicate that no measurement was made and/or no further testing was resumed.

TABLE I

| | IMPROVED MAGNAKOTE | | | | | |
|---|---|---|---|---|---|---|
| Example/ Formulation | Salt Fog[1] | Abrasion Resistance | Volatile Organics (VOC) | 48 Hour Drying Time | Sag Index | Rust Penetration |
| Comp. Ex. A Standard MAGNAKOTE Formula 20% Saci 200AS 7% Tung Oil 73% 100 wt. Naphthenic Oil | 340 Hours, 10% Corrosion (Typical) | Mediocre | ≈20% | OK | 0.4 (Poor) | Good |

TABLE I-continued

IMPROVED MAGNAKOTE

| Example/ Formulation | Salt Fog[1] | Abrasion Resistance | Volatile Organics (VOC) | 48 Hour Drying Time | Sag Index | Rust Penetration |
|---|---|---|---|---|---|---|
| Comp. Ex. B Same as "A" but with 300 weight oil | 400–500 Hours[2] (Extrapolated) | | | OK | | |
| Comp. Ex. C 63% 300 wt. oil 30% Saci 200AS 7% Tung Oil | 670 Hours[2] (25% Corrosion) | | | OK | | |
| Comp. Ex. D 20% Saci 200AS 5% Nasul 729 CaSulfonate 7% Tung Oil 68% 300 wt. oil | 500 Hours[2] 33% Corrosion | | ≈3% | Unsatisfactory | | |
| Example 1* Same as "D" but contains 0.06% each of 5% Cobalt and Manganese Hydrocures | 500 Hours 0 Corrosion | | ≈3% | Satisfactory | | |
| Comp. Ex. E 20% Saci 200AS 10% Nasul 1745 Sulfonate 7% Tung 63% 300 wt. oil | 0% Corrosion after 500 Hours 67% Corrosion after 750 Hours | | ≈3% | Poor | | |
| Example 2* Same as "E" above, but added 0.06% each of 5% Cobalt and Manganese Hydrocures | 5% Corrosion after 500 Hours 10% Corrosion after 750 Hours | | ≈3% | Good | | |
| Example 3* 25% Saci 200AS 10% Tung Oil 50% 300 wt. oil 15% Nasul Mg | 1200 Hours 1300 Hours | Very Good | 2.6% | Good | 0.67 (Very Good) | Good |
| Example 4* 25% Saci 200AS 10% Tung Oil 50% 300 wt. PARA 15% Nasul CA/W 1745 | 1344 Hours 984 Hours | Very Good | 2.1% | Good | 0.52 (Good) | Good |
| Example 5* 25% Saci 200AS 15% Tung Oil 45% 300 wt. oil 15% Nasul CA/W 1745 | 1416 Hours 1008 Hours | Very Good | 2.3% | Good | 0.80 (Very Good) | Good |

[1] Salt Fog results are evaluated at 10% corrosion, unless otherwise indicated. A three mil coating thickness is utilized. Tests are in triplicate (ASTM Method used).
[2] Results of tests on such compositions were variable. The values listed are typical.
*Examples 1, 2, 3, 4 and 5 contain 0.06 each of 5% Cobalt and Manganese Hydrocure driers.

Comparative Example A (which is MAGNAKOTE® ballast coating) and Comparative Example B indicate that there is an improvement in corrosion resistance when a 300 weight paraffinic oil is used instead of a 100 weight napthenic oil. Comparative Example C indicates that there is a further improvement if more 200 AS is used in the coating formulation. Comparative Examples D and E show a further improvement in corrosion resistance if an alkaline earth metal salt of an alkyl substituted napthalene sulfonate is added to the formulation.

Based upon experience in actual use, Comparative Example A, which is MAGNAKOTE® ballast coating, is effective for one to two years, i.e. it does not reach a significant level of corrosion until that time has elapsed. Although the improved coatings containing the naphthalene sulfonate salt (Comparative Examples D and E) last longer in the laboratory tests, this coating proved to be unsatisfactory with respect to drying time.

Examples 1–5 indicate that the drying time of the coatings containing NA-SUL S was satisfactory when the metal drier was added to the formulation. Thus Examples 1–5, which are within the scope of the subject invention, represent coating compositions which provide coatings that show improved corrosion resistance with satisfactory drying time. These coatings also showed good resistance to sag and abrasion. Based upon these tests, it is predicted that Compositions 3–5 would last up to four or five years under conditions of actual use.

We claim:

1. A soft skin coating composition comprising:
(a) an overbased alkaline earth sulfonate salt wherein said salt is present in an amount of about 5 to 80 percent by weight, based upon the weight of the coating composition;
(b) a salt of an alkyl substituted naphthalene sulfonate in an amount effective to improve the corrosion resistance of metal coated with the soft skin coating composition;
(c) a drying oil wherein said drying oil is present in an amount of about 1 to 25 percent by weight, based upon the weight of the coating composition;
(d) a metal drier in an amount effective to dry said drying oil; and
(e) a 200 to 900 weight hydrocarbon oil diluent wherein said hydrocarbon diluent is present in an amount of about 10 to 90 percent by weight, based upon the weight of the coating composition.

2. The coating composition of claim 1 wherein the salt of the alkyl substituted naphthalene sulfonate has the following structural formula:

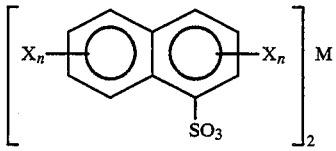

wherein "n" is 0 or 1, but at least one "n" is 1, and "X" is an alkyl group having 6 to 40 carbon atoms, and M is selected from the group consisting of alkaline earth metal cations and zinc.

3. The coating of claim 2 wherein the hydrocarbon oil diluent is a paraffinic oil having a weight of 200 to 400, the overbased alkaline earth sulfonate salt is used in an amount of 20 to 40 percent by weight, the drying oil is tung oil, and the salt of the alkyl substituted naphthalene sulfonate is such that X is from 8 to 19 carbon atoms.

4. The coating of claim 3 wherein the paraffinic oil is used in amount of 40 to 70 percent by weight, and the tung oil is used in an amount of 5 to 15 percent by weight, said weight based upon the total weight of the coating.

5. The coating of claim 4 wherein the metal of the metal drier is selected from the group consisting of transition metals and rare earth metals in amount of about 0.001 to 0.5 percent by weight, based upon the weight of the coating composition.

6. The coating composition of claim 5 wherein the metal drier is a carboxylate of a metal ion selected from the group consisting of magnesium, calcium, barium, cobalt, zinc, lead, copper, iron, manganese, and rare earth metals.

7. The coating of claim 6 wherein the metal drier is a mixture of carboxylate metal driers comprising cobalt carboxylate and manganese carboxylate is a ratio of cobalt to manganese from 1:10 to 10:1.

8. The coating composition of claim 7 wherein the salt of the alkyl substituted naphthalene sulfonate is such that both rings contain an X group where $X = C_9 H_{16}$ and M = calcium, zinc, magnesium, or barium.

9. A process for inhibiting corrosion on a surface exposed to a seawater environment, which comprises:
(1) applying a coating up to about 10 mils thick on said surface to be protected wherein said coating comprises:
(a) an overbased alkaline earth sulfonate salt wherein said salt is present in an amount of about 5 to 80 percent by weight, based upon the weight of the coating;
(b) a salt of an alkyl substituted naphthalene sulfonate having the following structural formula:

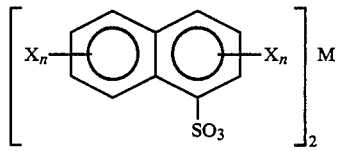

wherein "n" is 0 or 1, but at least one "n" is 1, and wherein "X" is an alkyl group having 6 to 40 carbon atoms, and M is selected from the group consisting of alkaline earth metal cations and zinc, and wherein said salt is present in an amount effective to improve the corrosion resistance of the surface coated with the coating;
(c) a drying oil wherein said drying oil is present in an amount of about 5 to 25 percent by weight, based upon the weight of the coating composition;
(d) a metal drier; and
(e) a 200 to 900 weight paraffinic oil wherein said paraffinic oil is present in an amount of about 10 to 90 percent by weight, based upon the weight of the coating; and
(2) allowing the coating to cure under ambient temperature.

10. The process of claim 9 wherein the salt of the alkyl substituted naphthalene sulfonate is such that X is from 8 to 19 carbon atoms.

11. The process of claim 10 wherein the paraffinic oil is from 200 to 400 weight, the overbased alkaline earth organic sulfonate salt is used in an amount of 20 to 40 percent by weight, the drying oil is tung oil, and the salt of the alkyl substituted naphthalene sulfonate is such that X is from 8 to 19 carbon atoms.

12. The process of claim 11 wherein the paraffinic oil is used in amount of 40 to 70 percent by weight, and the tung oil i used in an amount of 5 to 15 percent by weight, said weight based upon the total weight of the coating.

13. The process of claim 12 wherein the metal of the metal drier is selected from the group consisting of transition metals and rare earth metals in amount of about 0.001 to 0.5 percent by weight, based upon the weight of the coating.

14. The process of claim 13 wherein the metal drier is a carboxylate of a metal ion selected from the group consisting of cobalt, zinc, lead, copper, iron, and rare earth metals.

15. The process of claim 14 wherein the metal drier is a mixture of carboxylate metal driers comprising cobalt carboxylate and manganese carboxylate in a ratio of cobalt to manganese from 1:10 to 10:1.

16. The process of claim 15 wherein the salt of the alkyl substituted naphthalene sulfonate is such that both rings contain an group where $X = C_9 H_{16}$ and M = calcium, zinc, magnesium, or barium.

* * * * *